United States Patent [19]

Smith et al.

[11] 4,157,464
[45] Jun. 5, 1979

[54] MICROWAVE HEATING SYSTEM

[75] Inventors: William V. Smith, Chelmsford; Charles L. Gilliatt, Andover; Richard H. Edgar, Chelmsford, all of Mass.

[73] Assignee: Raytheon Company, Lexington, Mass.

[21] Appl. No.: 825,885

[22] Filed: Aug. 19, 1977

[51] Int. Cl.² ............................................. H05B 9/06
[52] U.S. Cl. ........................ 219/10.55 R; 19/10.55 F; 425/174.4
[58] Field of Search ................ 219/10.55 M, 10.55 R, 219/10.55 F; 425/41, 174.2, 174.4

[56] References Cited
U.S. PATENT DOCUMENTS

| | | | |
|---|---|---|---|
| 3,745,291 | 7/1973 | Peterson et al. | 219/10.55 R |
| 3,867,606 | 2/1975 | Peterson | 219/10.55 R |
| 3,898,411 | 8/1975 | Smeets | 219/10.55 R |

*Primary Examiner*—Arthur T. Grimley
*Attorney, Agent, or Firm*—David M. Warren; Joseph D. Pannone; Milton D. Bartlett

[57] ABSTRACT

A microwave heating system including an articulated waveguide arm for directing microwave energy into a subject to be heated. The articulated arm is positioned by a dual system comprising a sensor of the location of the surface being heated and a computer activated drive mechanism utilizing stored data of the form of the surface of the subject for providing a predetermined scanning path of microwave energy about the subject.

10 Claims, 3 Drawing Figures

MICROWAVE HEATING SYSTEM

BACKGROUND OF THE INVENTION

Microwave energy is utilized in a variety of industrial processes for heating of various products in those situations when the product can be best processed by a heating procedure wherein the heat is generated within the material of the product itself rather than by a radiation of the heat from a point outside the material of the product as is accomplished with ordinary radiant heating. One such application of microwave heating is in a preheating process for the curing of rubber tires, the preheating process being utilized to raise the temperature of the rubber from room temperature to immediately below the range of temperature customarily utilized for vulcanizing the rubber of the tires. The microwave heating is particularly desirable in the preheating of very large tires such as those utilized on earth moving equipment wherein a single tire may weigh a few tons, the tread depth on such tires having a depth of almost one foot which militates against the use of radiant energy from a source external to the rubber because of the great thermal insulation qualities of rubber. In the heating of such tires, it is primarily the tread which need be preheated by the microwave energy since the sidewalls are sufficiently thin to permit the heat generated in the vulcanizing presses to penetrate through the rubber for uniform curing or vulcanizing of the sidewalls.

A problem arises in that large flexible objects such as the aforementioned rubber tire may have a complex shape which must be followed by a microwave feed horn so as to uniformly inject the radiant energy through the surface of the object into the interior of the object where it reacts with the material of the object to produce the heat, a precise scanning of the object by the microwave feed horn being most useful in maintaining a uniform heating of the material of the subject. More particularly, in the case of a rubber tire which is to be preheated prior to its being placed in the vulcanizing mold, the tire is preferably placed upon a mandrel for holding the tire to permit its being scanned, and for imparting to the tire a shape which generally follows a predetermined model. Because of the complex shape of certain objects to be heated and/or a shape which may differ from a predetermined model, radiation has been directed in the general direction of the object to be heated even though such a generalized directing of the microwave energy toward the object may result in locally uneven heating.

SUMMARY OF THE INVENTION

The aforementioned problem is overcome and other advantages are provided by a microwave heating system which, in accordance with the invention, comprises an articulated waveguide arm which is coupled between a source of microwave energy and a radiator thereof. The radiator has a position sensor thereon, a photoelectric cell being utilized in the preferred embodiment of the invention, for signaling displacements of the radiator from a surface of the object to be heated. In addition, stored data of the form of the surface of the object is utilized in a computer activated drive mechanism for driving the articulated arm to scan the radiator in a format which generally follows the shape of the object. Deviations in the shape of the object from a predetermined model thereof, as is presented by the stored data, is accomplished by coupling signals of the position sensor to the drive mechanism whereby the radiator is further positioned to compensate for irregularities of the object.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
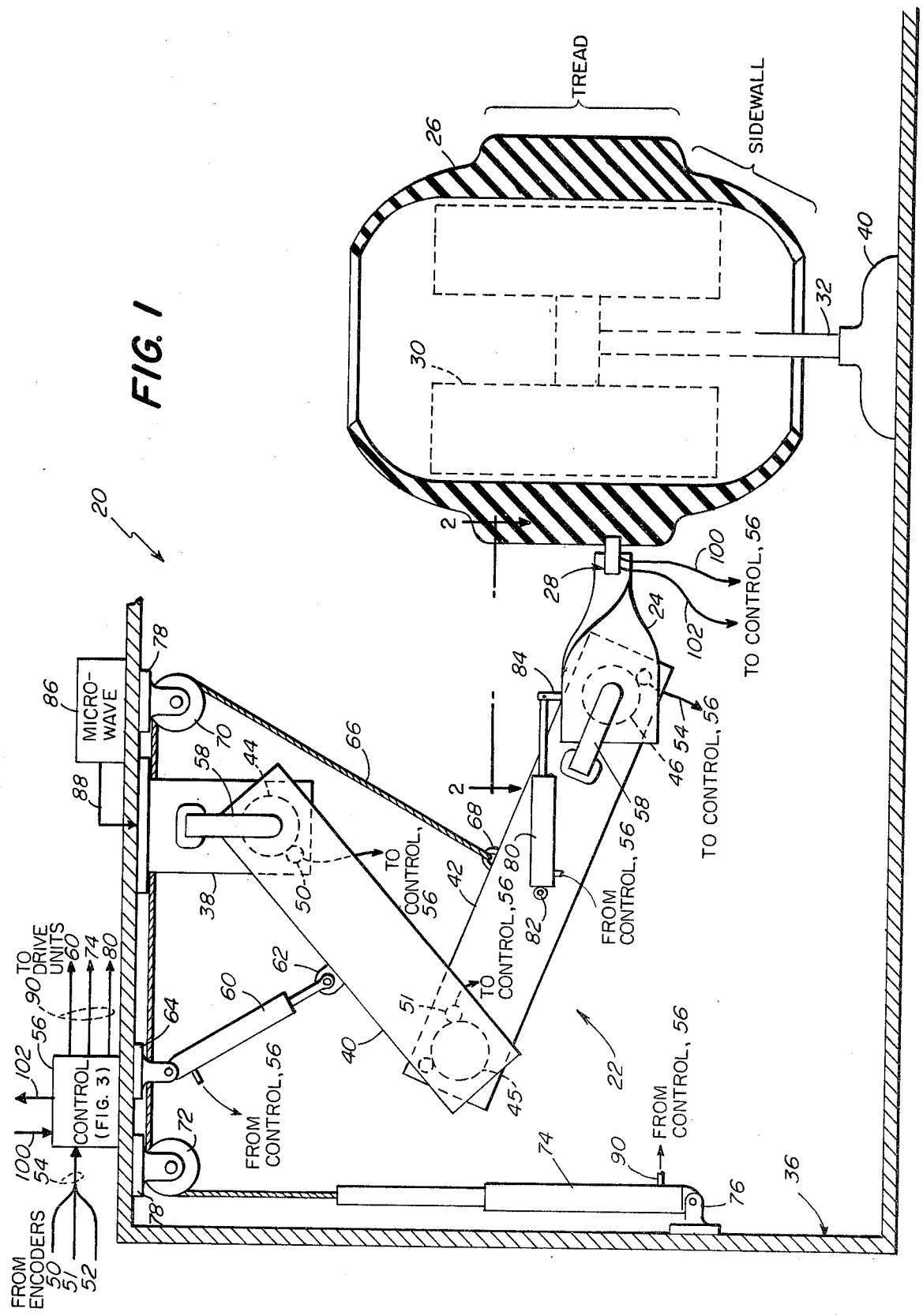
FIG. 1 is a side view of the scanning mechanism of the invention showing the articulated waveguide arm positioned for directing microwave radiation into a rubber tire.
Figure 2:
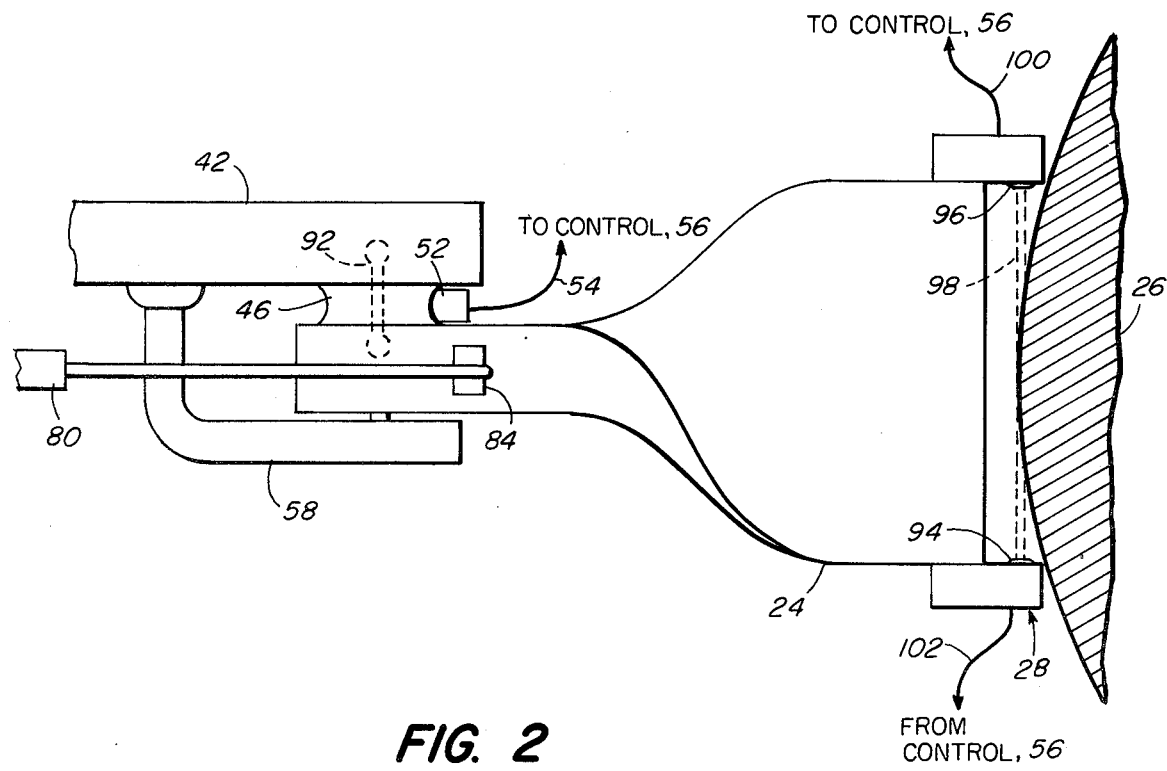
FIG. 2 is an auxiliary view taken along the lines 2—2 of FIG. 1 showing an upper surface of a radiator of microwave energy and the twisting of the input waveguide thereof to accommodate a pivot of the articulated arm.

Referring now to FIGS. 1 and 2, there is seen a microwave heating system 20 which, in accordance with the invention, comprises an articulated waveguide arm assembly 22 which positions a radiator 24 adjacent a tire 26 for directing a microwave radiation into the tire 26, the radiator 24 having a position sensor 28 affixed thereto at the radiating aperture thereof for signaling the displacement of the radiating aperture of the radiator 24 from the surface of the tire 26. The tire 26 is supported by a mandrel 30 which includes a central shaft 32 mechanically coupled to a motor 40 for rotating the mandrel 30 and the tire 26 as the tire 26 is illuminated by microwave radiation from the radiator 24. The tire 26 and the arm assembly 22 is enclosed within a shelter 36 shown partially cut-away. The shelter 36 is built of an electrically conducting material, steel having been utilized in the building of the preferred embodiment, for containing the microwave radiation within the shelter 36 and preventing its leakage into regions outside the shelter 36.

The arm assembly 22 comprises four sections of waveguide, namely, the aforementioned radiator 24, a base 38 by which the arm assembly 22 is secured to the roof of the shelter 36, an upper arm 40 and a forearm 42. The four sections of the arm assembly 22 are coupled together by three rotary waveguide joints, namely, a shoulder joint 44 whereby the upper arm 40 is rotatably secured to the base 38 as microwave energy is coupled from the base 38 to the upper arm 40, an elbow joint 45 whereby the forearm 42 is rotatably secured to the upper arm 40 as microwave energy is coupled from the upper arm 40 at the forearm 42, and a wrist joint 46 whereby the radiator 24 is rotatably secured to the forearm 42 as microwave energy is coupled from the forearm 42 via the wrist joint 48 to the radiator 24. Each of three angle encoders 50, 51 and 52 are mechanically coupled between a member of the arm assembly 22 and one of the rotary waveguide joints 44–46, the encoders 50–52 being coupled respectively to the joints 44–46. The encoders 50–52 generate electrical signals representing the respective angles of rotation of the rotary joints 44–46, these electrical signals being coupled from the encoders 50–52 via lines 54 shown fanning into a controller 56 which will be described subsequently with reference to FIG. 3.

Structural rigidity at the rotary couplings of the respective member of the arm assembly are provided by three struts 58, two of these struts 58 being shown in the figure. One strut 58 is secured at the end thereof to the base 38, the opposite end of the strut 58 being secured rotatably to the upper arm 40 at the axis of rotation and on the side of the upper arm 40 opposite the shoulder joint 44. In a similar manner, a strut 58 is connected between the forearm 42 and the radiator 24 and a third strut 58 (not shown) is coupled between the upper arm 40 and the forearm 42. The upper arm 40 is positioned relative to the roof and walls of the shelter 36 by hydraulic drive unit 60 pivotably coupled to the upper arm 40 by pivot 62 and pivotably coupled to the roof of the shelter 36 by pivot 64. The forearm 42 is raised and lowered via a cable 66 secured via a hook 68 to the forearm 42, the cable 66 passing via pulleys 70 and 72 to a hydraulic drive unit 74 which, in turn, is secured to a wall of the shelter 36 by a pivot 76. The pulleys 70 and 72 are secured by supports 78 to the roof of the shelter 36. A third hydraulic drive unit 80 is pivotably secured between the forearm 42 and the radiator 24 by pivots 82 and 84 for controlling the orientation of the radiator 24 relative to the forearm 42. The roof of the shelter 36 serves as a support for the aforementioned controller 56 and also serves as a support for a generator 86 of microwave energy which is shown schematically coupled via line 88 through the roof of the shelter 36 into the waveguide arm assembly 22 at the base 38 thereof.

Each of the drive units 60, 74 and 80 comprise an outer cylinder which encloses a rod for imparting motion to the members of the arm assembly 22 in accordance with the movement of hydraulic fluid coupled thereto via line 90 from the controller 56. Thereby, as will be explained subsequently with reference to FIG. 3, the controller 56 is able to individually activate the drive units 60, 74, and 80 for rotating respectively the shoulder joint 44, the elbow joint 45 and the wrist joint 46 to position the upper arm 40 and the forearm 42 relative to the shelter 36, and to orient the radiator 24 relative to the forearm 42.

The waveguide members of the arm assembly each comprise a long wall and a short wall as is customarily utilized in the fabrication of waveguides. The long walls of the members of the arm assembly 22 are in vertical planes and a rotary joints 44–46 are secured between the long walls of the respective members of the arm assembly 22. With respect to the radiator 24, the input portion thereof, whereby microwave energy is coupled thereto from the forearm 42, has its long wall in a vertical plane for mating with the wrist joint 46. However, the radiating aperture of the radiator 24 is oriented in the horizontal plane and, accordingly, the radiator 24 has a 90° twist along its longitudinal axis for coupling the radiating aperture to the input portion of the radiator 24. The interior portion of the wrist joint 46 utilizes a coaxial structure employing a central probe 92, a similar construction feature being utilized in the rotary joints 44–45.

The sensor 20 comprises a light transmitter 24 and a light receiver 96 for transmitting and receiving a beam 98 of light past the surface of the tire 26. For example, the light transmitter may comprise an electric light bulb or a light emitting diode with a lens thereon while the light receiver may comprise a photoelectric cell which, in response to the light energy in the beam 98, produces an electrical signal. The electrical signal of the light receiver 96 is coupled via line 100 to the controller 56, a second line 102 being utilized to couple electrical energy from the controller 56 for energizing the light transmitter 24.

Figure 3:
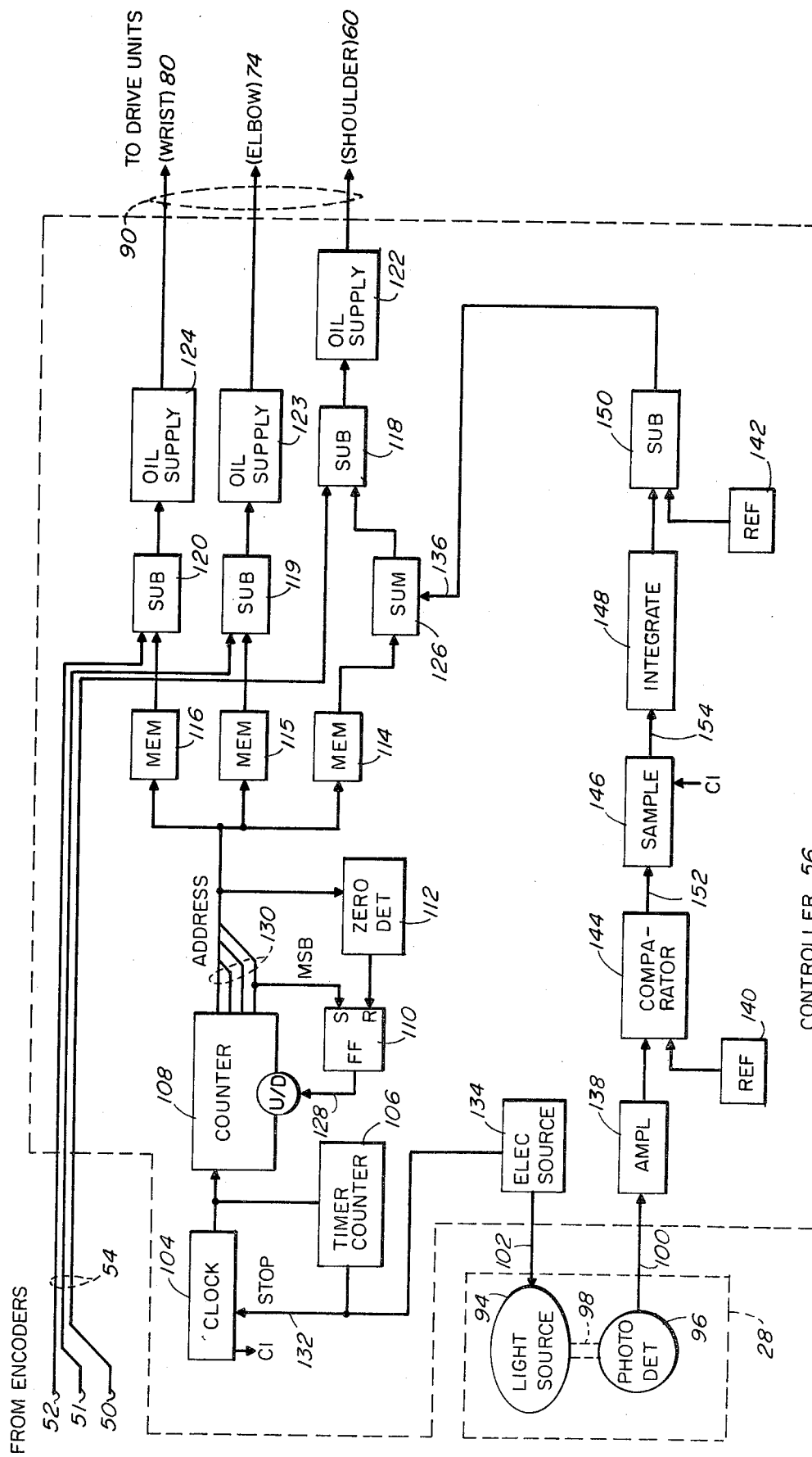
FIG. 3 is a block diagram of a computerized system including memories of stored data relating to the form of the rubber tire and showing the connection of a position sensing signal for directing the movement of the articulated arm of FIG. 1.

Referring now to FIG. 3, the controller 56 comprises a clock 104, a timer 106, a counter 108, a flip flop 110, a detector 112 of the number zero, three memories 114–116, three subtractors 118–120, three oil supplies 122–124 and a summer 126. During the scanning operation of FIG. 1 wherein the arm assembly 22 moves the radiator 24 up and down during rotation of the tire 26, the controller 56 is providing signals to the drive units 60, 74 and 80 as a function of time so that the radiating aperture of the radiator 24 follows the prescribed spiral path over the tread portion of the tire 26. The timing of various portions of the scanning path of the radiator 24 is governed by the clock 104, the timer 106 and the counter 108. The counter 108 is an up/down counter which counts either up or down depending on the signal applied to the up/down control terminal via line 128 from the flip flop 110. The counter 108 counts pulses provided by the clock 104 and provides a multidigit number on lines 103 representing the count, the multidigit number being coupled to the memories 114–116 and to the detector 112. The most significant bit of the count is also coupled to the flip flop 110 for setting the flip flop. Upon the appearance of a count of zero on the lines 130, the detector 112 transmits a signal to the reset terminal of the flip flop 110 for resetting the flip flop 110. The timer 106, which may comprise a counter, counts the number of clock pulses provided by the clock 104 and, after a predetermined number of clock pulses have been counted, provides a signal on line 132 which stops the clock 104, the signal on line 132 also being coupled to a source 134 of electric power which powers the sensor 28. Thereby, the timer 106 stops the operation of the system 20 after a predetermined amount of time so that the tire 26 of FIG. 1 is heated to the desired temperature.

The multidigit number appearing on the line 130 serves as an address to the memories 114–116. In response to the addresses, each of the memories 114–116 produces a signal indicating the required angle of rotation at an individual one of the rotary joints 44–46 of FIG. 1. Thus, the memory 114 provides the desired angle of rotation of the shoulder joint 44, the memory 115 provides the angle of rotation for the elbow joint 45, and the memory 116 provides the desired angle of rotation for the wrist joint 46. Via the lines 54, the aforementioned signals of the angle encoders 50, 51 and 52 are coupled respectively to the subtractors 118, 119 and 120 wherein the signals are subtracted respectively from the desired angles as provided by the memories 114–116. Thereby, the output signals of the subtractors 118–120 have a zero value when the angle of rotation of a rotary joint is equal to the desired angle of rotation as provided by the respective memories 114–116. The subtractors 118–120 include digital-to-analog converters (not shown) so that an analog signal is provided by each of the subtractors 118–120 respectively to each of the oil supplies 122–124. With respect to the memory 114 and the subtractor 118, it is noted that the desired angle of rotation provided by the memory 114 is first summed with a signal on line 136 by the summer 126 before being coupled to the subtractor 120. As will be described hereinafter, the signal on line 136 represents a correction term provided by the sensor 28. Thus, the signal at the output terminal of the subtractor 118 is of zero value when the angle of rotation of the shoulder joint 44 is equal to that requested by the memory 114 plus the correction term on line 136. The oil supplies 122-124 are activated to increase or decrease these supplies of oil, or other suitable hydraulic fluid, in accordance with the signals produced by the respective subtractors 118-120. The oil is coupled directly from the supplies 122-124 via the lines 90 to activate respectively the drive units 60, 74 and 80.

The controller 56 further comprises an amplifier 138, two sources of reference signal 140 and 142, a comparator 144, a sampler 146, an integrator 148 and a subtractor 150. Electrical signals produced by the light receiver 96, shown as a photodetector in FIG. 3, are coupled via line 100 to the amplifier 138 which amplifies the signals to a suitable amplitude for operating the comparator 114. The comparator 144 produces a relatively high voltage on line 152 when the amplitude of the output signal of the amplifier 138 is greater than the reference signal provided by the source 140, and provides a relatively low voltage of line 152 when the amplitude of the output signal of the amplifier 138 is less than or equal to the amplitude of the reference signal provided by the source 140. The clock 104 provides clock pulses at terminal C1 for operating the sampler 146 to produce on line 154 successive samples of the voltage on line 152. Thereby, there appears on line 154 a succession of relatively high voltage pulses, corresponding to a logic state of 1 or a succession of relatively low voltage pulses, corresponding to a logic state of 0, depending on whether the beam 98 propagates past the surface of the tire 26, or whether the surface of the tire 26 is sufficiently close to the radiator 24 so as to interrupt the beam 98.

When the radiator 24 is positioned at a desired spacing from the surface of the tire 26, the beam 98 is partially interrupted so that, on the average, an equal number of high voltage and low voltage pulses appear on the line 154. The integrator 148 has an integration time which is sufficiently long to produce an averaging of the pulses on the line 154 but, is sufficiently short so as to permit the signal on line 136 to vary in accordance with variations of the surface of the tire 26 from a state of constant radius. For example, the integration time of the integrator 148 may be set in accordance with the speed of rotation of the shaft 32 of FIG. 1 so that, for example, the distance between the radiating aperture of the radiator 24 and the surface of the tire 26 is averaged over an integration time equal to the period of time in which the tire 26 rotates through an angle of 30°. The output signal of the integrator 148 is subtracted from a reference signal of the source 142 by the subtractor 150. The subtractor 150 produces the signal on line 136 which is seen to be either positive or negative depending on the relative magnitudes of the output signal of the integrator 148 and the reference signal of the source 142. Thereby, the signal of the subtractor 118 coupled to the supply 122 is made to vary in accordance with the desired angle directed by the memory 114 to actuate the drive unit 60 for the upper arm 40 of FIG. 1. The pivoting of the upper arm 40 by the drive unit 60 about the shoulder joint 44 results in a horizontal displacement of the radiator 24 from the tire 26. In this way, a succession of signals resulting from the intrusion of points from the surface of the tire 26 into the beam 98 are combined to produce a smoothly varying signal on line 136 which maintains the displacement of the radiator 24 relative to the tire 26.

It is noted that as the radiator 24 is raised and lowered, the radiator 54 is pivoted by the drive unit 80 relative to the forearm 42 so that the longitudinal axis of the radiator 24 coincides with a normal to the surface of the tire 26. In the event that the tread surface is cylindrical, the memories 114-116 are stored with instruction commands for the angles of rotation to produce the aforementioned coinciding of the axis of the radiator 24 with the normal to the surface. In the event that the tread surface is bowed, then a separate set of instructions is stored in the set of memories 114-116 so that the aforementioned relationship of the axis of the radiator 24 to the normal of the tire surface is maintained.

With reference to the operaton of the flip flop 110, it is noted that the operation of the controller 56 begins with a count of zero on the lines 130, this corresponding to the lowest point on the scanning path of the radiator 24 about the tire 26. Upon the count of zero, the detector 112 resets the flip flop 110 so that the counter 108 counts up. When the most significant bit of the lines 130 is activated, corresponding to the highest position of the radiator 24 during its scan, the flip flop 110 is reset, the resetting of the flip flop 110 altering the signal on line 128 to activate the counter 108 to count down. Thus, the sequence of counts or addresses on the lines 130 proceeds in the reverse direction as the spiral scan path proceeds downwardly until the detector 112 again senses a zero. Thus, the spiral scan continues in a succession of upward and downward directions until the timer 106 stops the operation via the signal on line 132 when the tire 26 has been heated for the proper amount of time.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. In a microwave heating system, an apparatus for positioning a radiator of microwave energy relative to the surface of an object to be heated by said energy, said apparatus comprising:
   means coupled to said radiator for signaling the presence of irregularities in the shape of said surface;
   means for varying the orientation of said radiator in accordance with said shape to maintain the orientation of said radiator relative to said surface; and
   means coupled to said signaling means for adjusting a spacing between said radiator and said surface.

2. A system according to claim 1 wherein said signaling means is connected to said radiator, an adjustment in said spacing of said radiator relative to said surface maintaining the relative orientation of said signaling means relative to said surface.

3. A system according to claim 1 wherein said signaling means includes means for combining signals thereof for averaging the irregularities occurring over a predetermined interval of time.

4. A system according to claim 1 wherein said adjusting means comprises an articulated waveguide having a first rotary waveguide joint oriented relative to said object to permit a movement of said radiator in a plane perpendicular to a normal to the surface of said object.

5. A system according to claim 4 wherein said articulated waveguide further comprises a second rotary waveguide joint spaced apart from said first mentioned rotary waveguide joint to permit movement of said radiator in a direction normal to said surface of said object.

6. A microwave heating system comprising:
means for guiding a radiator of microwave energy along the surface of an object to be heated by said microwave energy;
means coupled to said guiding means for varying the orientation of a radiating aperture of said radiator at a predetermined angle relative to a normal to said surface;
means coupled to said radiator for spacing said radiator at a predetermined distance from said surface, said spacing means including means for signaling the presence of irregularities in said surface, and means for combining signals of said signaling means to adjust said spacing in accordance with a pattern of said irregularities.

7. A system according to claim 6 wherein said guiding means includes an articulated waveguide comprising a waveguide rotary joint oriented relative to said object to permit said radiator to be moved in a plane perpendicular to a normal of said surface.

8. A system according to claim 7 wherein said articulated waveguide comprises a second rotary waveguide joint spaced apart from said first mentioned rotary waveguide joint to permit movement of said radiator along a normal to said surface.

9. A system according to claim 8 wherein said guiding means includes a memory storing data of said surface, said data including angles of rotation of said first and said second rotary waveguide joints.

10. A system according to claim 6 wherein said guiding means includes a memory storing data of said surface.

* * * * *